(12) United States Patent
Jones et al.

(10) Patent No.: US 10,732,025 B2
(45) Date of Patent: Aug. 4, 2020

(54) VEHICLE ANALYSIS SYSTEM AND ASSOCIATED METHODS

(71) Applicant: Walmart Apollo, LLC, Bentonville, AR (US)

(72) Inventors: Nicholaus Adam Jones, Fayetteville, AR (US); Robert James Taylor, Rogers, AR (US); Aaron James Vasgaard, Fayetteville, AR (US); Matthew Allen Jones, Bentonville, AR (US)

(73) Assignee: Walmart Apollo, LLC, Bentonville, AR (US)

(*) Notice: Subject to any disclaimer, the term of this patent is extended or adjusted under 35 U.S.C. 154(b) by 521 days.

(21) Appl. No.: 15/621,681

(22) Filed: Jun. 13, 2017

(65) Prior Publication Data

US 2018/0058911 A1 Mar. 1, 2018

Related U.S. Application Data

(60) Provisional application No. 62/379,974, filed on Aug. 26, 2016.

(51) Int. Cl.
| | |
|---|---|
| *G01G 19/02* | (2006.01) |
| *G01G 19/42* | (2006.01) |
| *G01G 19/414* | (2006.01) |
| *G06Q 50/30* | (2012.01) |
| *G06Q 30/02* | (2012.01) |
| *G08G 1/00* | (2006.01) |
| *G08G 1/02* | (2006.01) |

(52) U.S. Cl.
CPC ............ *G01G 19/42* (2013.01); *G01G 19/02* (2013.01); *G01G 19/414* (2013.01); *G06Q 30/0201* (2013.01); *G06Q 50/30* (2013.01); *G08G 1/205* (2013.01); *G08G 1/02* (2013.01)

(58) Field of Classification Search
CPC ...... G01G 19/42; G01G 19/414; G01G 19/02; G08G 1/205; G08G 1/02; G06Q 30/0201; G06Q 50/30
See application file for complete search history.

(56) References Cited

U.S. PATENT DOCUMENTS

| | | | |
|---|---|---|---|
| 5,123,494 | A | 6/1992 | Schneider |
| 7,788,063 | B2 | 8/2010 | Bodin et al. |
| 7,908,237 | B2 | 3/2011 | Angell et al. |
| 8,284,041 | B2 | 10/2012 | Cuddihy et al. |
| 8,736,458 | B2 | 5/2014 | Reynolds et al. |
| 8,991,545 | B2 | 3/2015 | Furst |
| 2004/0084226 | A1 | 5/2004 | Wright |
| 2006/0052980 | A1* | 3/2006 | LaFollette ............... G01G 19/02 702/173 |
| 2006/0108154 | A1 | 5/2006 | Mack et al. |
| 2009/0006286 | A1* | 1/2009 | Angell ............... G06K 9/00771 706/12 |

(Continued)

*Primary Examiner* — John E Breene
*Assistant Examiner* — Eyob Hagos
(74) *Attorney, Agent, or Firm* — McCarter & English, LLP

(57) ABSTRACT

A vehicle analysis system including one or more weight sensors positioned to determine a weight of a vehicle within a pre-defined geographic location in the vicinity of a location of interest is described. The vehicle analysis system acquires data related to vehicles visiting the location of interest that may be saved in a database to provide further insight into individual's visiting the location of interest.

17 Claims, 9 Drawing Sheets

(56) References Cited

U.S. PATENT DOCUMENTS

| | | | |
|---|---|---|---|
| 2009/0192756 A1* | 7/2009 | Bodin | G01G 19/12 |
| | | | 702/129 |
| 2011/0133908 A1* | 6/2011 | Leung | H04W 4/14 |
| | | | 340/286.02 |
| 2011/0145053 A1 | 6/2011 | Hashim-Waris | |
| 2015/0178678 A1* | 6/2015 | Carr | G06Q 10/0838 |
| | | | 705/341 |
| 2016/0297324 A1* | 10/2016 | Taylor | B60N 2/002 |
| 2018/0245966 A1* | 8/2018 | Mittal | G01G 19/086 |

* cited by examiner

VEHICLE ANALYSIS SYSTEM AND ASSOCIATED METHODS

CROSS-REFERENCE TO RELATED APPLICATIONS

This application claims the benefit of commonly assigned U.S. Provisional Patent Application No. 62/379,974, which was filed on Aug. 26, 2016. The entire content of the foregoing provisional patent application is incorporated herein by reference.

BACKGROUND

Different types of motor vehicles have different physical characteristics and tend to be driven by drivers of different backgrounds. One of these vehicle characteristics is weight. For example, compact cars tend to weigh considerably less than luxury sport utility vehicles (SUVs), and sedans may weigh more than a light pickup truck.

SUMMARY

Exemplary embodiments of the present invention provide a vehicle analysis system that tracks data associated with a detected vehicle's visit to a location of interest. More particularly, embodiments may determine the duration and/or frequency of visits of an individual's vehicle to a location of interest by identifying a vehicle based on weight characteristics. The exemplary vehicle analysis system includes weight sensors disposed within a geographic location in the vicinity of a location of interest that may be used to detect an arrival weight and time, an unoccupied weight of the vehicle, used to determine the number of individuals in the vehicle, and a departure time and weight. The departure weight may be analyzed with respect to the arrival weight to provide an indication of the weight of any purchases made at the location of interest. The vehicle analysis system can also include audio sensors for estimating the number of passengers in the vehicle based on the number of vehicle doors closed. The weight data and audio data can further be correlated with transaction data for an individual associated with the vehicle to determine the exact items purchased by the individual, and improve the overall accuracy of the vehicle analysis system. Acquired data related to visit duration and/or frequency, average transaction size and cumulative traffic data for the location of interest may be saved in a database to provide further insight into individual's visiting the location of interest.

In one embodiment, an exemplary vehicle analysis system includes one or more weight sensors positioned to determine a weight of a vehicle. Each of the one or more weight sensors is associated with a pre-defined geographic location in the vicinity of a location of interest. The vehicle analysis system also includes a weight analysis subsystem in electronic communication with and configured to receive vehicle weight data from the one or more weight sensors. The weight analysis subsystem includes a location database storing the pre-defined geographic location of each of the one or more weight sensors. The weight analysis subsystem further includes a processing device equipped with a processor and a memory. The memory includes instructions for a weight analysis module that, when executed by the processor, cause the weight analysis subsystem to detect an arrival time of the vehicle at the pre-defined geographic location based on a detectable vehicle weight occurring at the pre-defined geographic location. Execution of the instructions for the weight analysis module cause the weight analysis subsystem to determine an arrival weight of the vehicle based on vehicle weight data generated by the one or more sensors at the arrival time and to detect an exit of one or more occupants from the vehicle based on an identified reduction in the determined vehicle arrival weight to an unoccupied weight. An exit weight equals the amount of the reduction from the arrival weight to the unoccupied weight. Execution of the weight analysis module instructions further cause the weight analysis subsystem to estimate a number of occupants of the vehicle based on the exit weight and to add at least one of the vehicle arrival time, arrival weight and estimated number of occupants to a stored set of data associated with a location at which the one or more weight sensors are located.

In an embodiment, an exemplary method of vehicle analysis includes determining, by one or more weight sensors, a weight of a vehicle. Each of the one or more weight sensors is associated with a pre-defined geographic location in the vicinity of a location of interest. The method also includes receiving, at a weight analysis subsystem in electronic communication with the one or more weight sensors, vehicle weight data from the one or more weight sensors and detecting an arrival time of the vehicle at the pre-defined geographic location based on a presence of a vehicle weight at the pre-defined geographic location. Additionally, the method includes determining an arrival weight of the vehicle based on vehicle weight data generated by the one or more sensors at the arrival time and detecting an exit of one or more occupants from the vehicle based on an identified reduction in the determined vehicle arrival weight to an unoccupied weight, an exit weight equaling the amount of the reduction from the arrival weight to the unoccupied weight. Further, the method includes estimating a number of occupants of the vehicle based on the exit weight and adding at least one of the vehicle arrival time, arrival weight and estimated number of occupants to a stored set of data associated with a location at which the one or more weight sensors are located.

In an embodiment, an exemplary non-transitory medium holding computer-executable instructions for vehicle analysis that when executed, cause at least one processing device to determine, by one or more weight sensors, a weight of a vehicle. Each of the one or more weight sensors is associated with a pre-defined geographic location in the vicinity of a location of interest. The instructions, when executed, further cause the at least one processing device to receive, at a weight analysis subsystem in electronic communication with the one or more weight sensors, vehicle weight data from the one or more weight sensors. The instructions, when executed, also cause the at least one processing device to detect an arrival time of the vehicle at the pre-defined geographic location based on a presence of a vehicle weight at the pre-defined geographic location and to determine an arrival weight of the vehicle based on vehicle weight data generated by the one or more sensors at the arrival time. Additionally, the instructions, when executed, further cause the at least one processing device to detect an exit of one or more occupants from the vehicle based on an identified reduction in the determined vehicle arrival weight to an unoccupied weight, an exit weight equaling the amount of the reduction from the arrival weight to the unoccupied weight. Further, the instructions, when executed, cause the at least one processing device to estimate a number of occupants of the vehicle based on the exit weight and to add at least one of the vehicle arrival time, arrival weight and estimated number of occupants to a stored set of data associated with a location at which the one or more weight sensors are located.

It should be appreciated that other combinations and/or permutations of embodiments are envisioned as also being within the scope of the present invention. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the disclosed vehicle analysis systems and associated methods, reference is made to the accompanying figures. The accompanying figures, which are incorporated in and constitute a part of this specification, illustrate one or more embodiments of the invention and, together with the description, help to explain the invention. In the figures.

DETAILED DESCRIPTION

Figure 1:
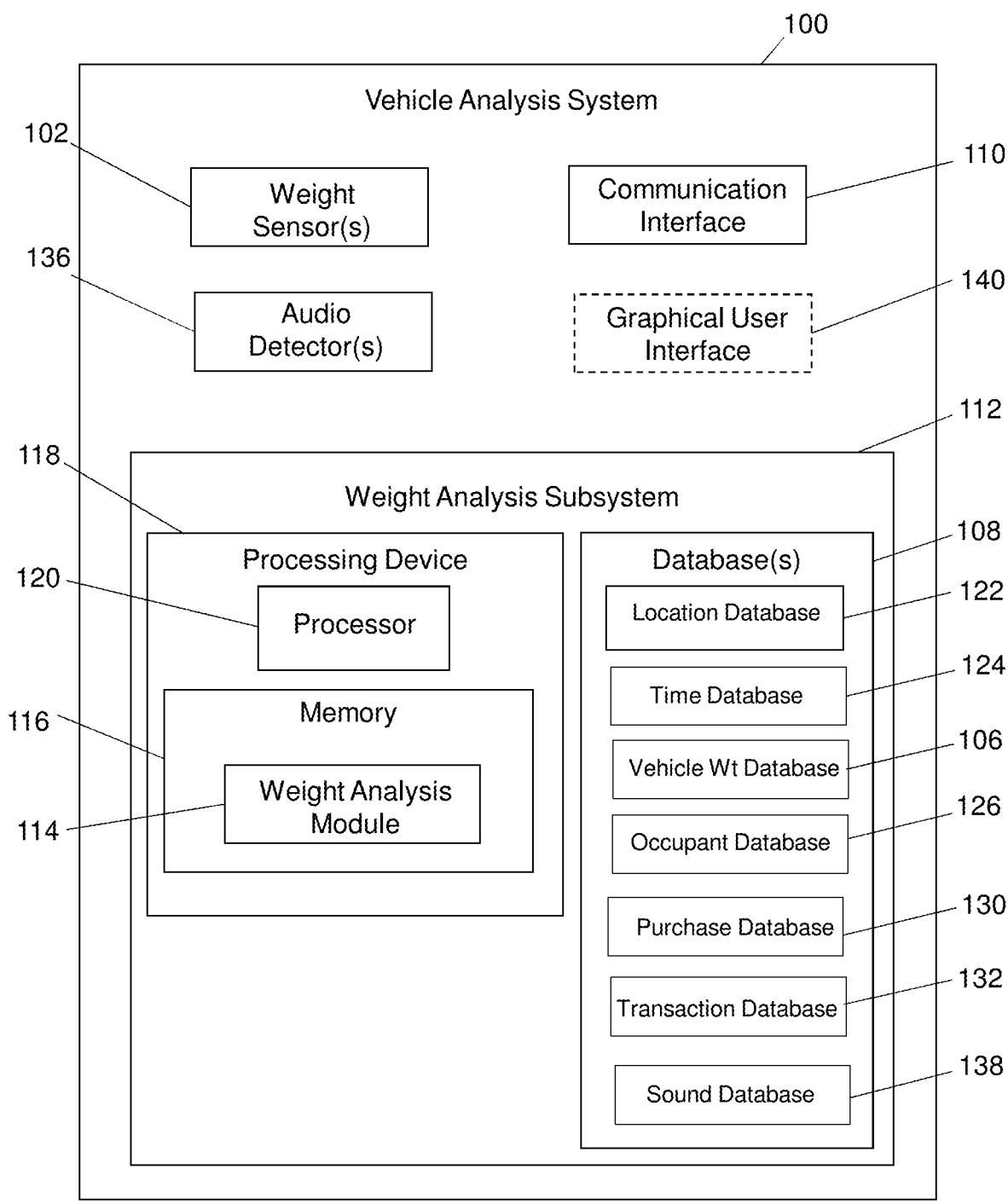
FIG. 1 is a block diagram of an exemplary vehicle analysis system in an embodiment.

It should be understood that the relative terminology used herein, such as "front", "rear", "left", "top", "bottom", "vertical", "horizontal", "up" and "down" is solely for the purposes of clarity and designation and is not intended to limit embodiments to a particular position and/or orientation. Accordingly, such relative terminology should not be construed to limit the scope of the present disclosure. In addition, it should be understood that the scope of the present disclosure is not limited to embodiments having specific dimensions. Thus, any dimensions provided herein are merely for an exemplary purpose and are not intended to limit the invention to embodiments having particular dimensions.

Exemplary embodiments of the present invention provide a vehicle analysis system that acquires data associated with individuals visiting a location of interest by detecting a weight of the individual's vehicle at various times during the visit. The exemplary vehicle analysis system includes weight sensors disposed within a geographic location in the vicinity of the location of interest that may detect the arrival weight, unoccupied weight and exit weight of the vehicle. The vehicle analysis system can include audio sensors for estimating and/or confirming the number of passengers in the vehicle based on the number of vehicle doors closed. The weight data and audio data can be correlated with transaction data for the individual or individuals traveling in the vehicle to determine the exact items purchased by the individual(s) and improve the overall accuracy of the vehicle analysis system.

In one embodiment, the location of interest is a retail establishment, the individuals are customers visiting the retail establishment and the weight sensors are arranged in individual parking lot spaces. In other embodiments, the location of interest may be a non-retail facility from which individuals return with purchased and/or non-purchased objects. The exemplary vehicle analysis system can be used to obtain demographic information regarding individuals visiting the retail establishment without directly involving individuals in the process. As such, it functions as a passive data gathering system. For example, the vehicle analysis system can determine the weight of products purchased by an individual at the retail establishment, and the number of individuals visiting the retail establishment. The vehicle analysis system can track the vehicles based on the time of entry and exit from a pre-defined geographic location, such as a parking spot or other area in the vicinity of the establishment to determine the length of time spent at the retail establishment, and can correlate transaction data with the data corresponding to the individual's vehicle to determine which purchases were made by the individual. The acquired data may be stored in a database to provide insight into the customer base for the establishment. It should be appreciated that the vehicle analysis system described herein is not limited to use with retail establishments and may deployed at other locations of interest.

FIG. 1 is a block diagram of an exemplary vehicle analysis system 100 (hereinafter "system 100") in accordance with exemplary embodiments of the present disclosure. The system 100 generally includes one or more weight sensors 102 positioned within a pre-defined geographic area or location in the vicinity of the location of interest (e.g., an individual vehicle parking space, or the like). Each of the weight sensors, such as a weight scale, is positioned to determine, measure or detect a weight of a vehicle entering the pre-defined geographic location. For example, each parking space within a parking lot associated with a location of interest can include a weight sensor 102 configured to determine the weight of the vehicle parking in the specific parking space.

As will be discussed in greater detail below, the weight of the vehicle can be detected by the weight sensors 102 at different points in time, e.g., upon arrival to the pre-defined geographic location while still including the occupant(s) and prior to making purchases, after exit of the occupant(s) from the vehicle, after inclusion of products purchased at the location of interest into the vehicle and after the re-entry of the occupant(s) into the vehicle prior to exit from the pre-defined geographic location. The detected weight of the vehicle at different points in time can be electronically transmitted to a vehicle weight database 106 electronically located in one or more databases 108. In an embodiment, a communication interface 110 can electronically transmit the detected weight data corresponding to each vehicle from the weight sensors 102 to the vehicle weight database 106.

The system 100 includes a weight analysis subsystem 112 configured to receive data corresponding to the weight detected by each of the weight sensors 102 from the vehicle weight database 106. In particular, the weight analysis subsystem 112 can be in electronic communication (through wired and/or wireless channels) with the weight sensors 102 and/or the database 108, and can be configured to receive the vehicle weight data stored in the vehicle weight database 106. The weight analysis subsystem 112 includes a processing device 118 equipped with a processor 120 and a memory 116. The memory 116 can include instructions for executing the weight analysis module 114. It will be appreciated that FIG. 1 depicts an exemplary configuration of the system 100 and other configurations are possible within the scope of the present invention.

System 100 includes a database 108 that may include a location database 122 that electronically stores data corresponding to the location of each of the weight sensors 102 within the pre-defined geographic location. For example, the location database 122 can store information relating to the identification number of a weight sensor 102 and a corresponding parking space identification, as well as information relating to the weight sensor 102 specifications. The weight analysis subsystem 112 can be executed to detect an arrival time of the vehicle at the pre-defined geographic location. In particular, the weight sensor 102 can detect a change in weight in the pre-defined geographic location upon entry of the vehicle into the pre-defined geographic location (such as occurs when a vehicle first parks in a parking space), and the time of detection can be labeled as the arrival time of the vehicle. The arrival time can be electronically transmitted to and stored in a time database 124 via the communication interface 110.

The arrival weight of the vehicle can be determined based on the vehicle weight data generated by the respective weight sensor 102 at the arrival time of the vehicle into the pre-defined geographic area. The arrival weight can be electronically transmitted to and stored in the vehicle weight database 106 via the communication interface 110. The arrival weight of the vehicle includes the weight of the vehicle itself and any occupants within the vehicle. In an embodiment, the weight analysis subsystem 112 can determine the type of vehicle based on the arrival weight (e.g., a compact vehicle, a full size vehicle, a cross-over vehicle, a minivan, a sports utility vehicle or truck, a large sports utility vehicle or truck, or a heavy large truck). The weight sensor 102 further may detect an exit of one or more occupants from the vehicle (e.g., occupants leaving the vehicle to make purchases at the nearby location of interest) based on a detected or identified reduction in the determined vehicle arrival weight. This subsequent detection can be labeled by the weight analysis subsystem 112 as an unoccupied vehicle weight, and can be electronically transmitted to and stored in the vehicle weight database 106.

An exit weight can be determined by the weight analysis subsystem 112 as substantially equal to the amount of reduction from the arrival vehicle weight to the unoccupied vehicle weight, and corresponds to the estimated total occupant weight. The exit weight (i.e., the estimated cumulative occupant weight) can be electronically transmitted to and stored in the occupant database 126. Based on the exit weight, the weight analysis subsystem 112 can estimate a number of occupants of the vehicle (e.g., the number of occupants who exited the vehicle). In an embodiment, the number of occupants can be estimated by dividing the exit weight by an expected occupant weight. In an embodiment, the expected occupant weight can be based on the demographics (e.g., average weight of adults) in the geographic area surrounding the location of interest.

In an embodiment, the expected occupant weight can be determined based on the nature and/or geographic location of the location of interest, the time of day of detection of the arrival of the vehicle, combinations thereof, or the like. For example, if the weight analysis subsystem 112 detects an exit weight below 200 lbs during the day when most children would be in school, an estimate of a single occupant can be made. As a further example, if the weight analysis subsystem 112 detects an exit weight above 350 lbs during the evening when most children would be home from school, an estimate of two occupants can be made. Further, if occupants exit the vehicle at different points in time the weight analysis subsystem can adjust the estimated number of occupants with each change in weight detected.

In an embodiment, the estimated number of occupants of the vehicle can be determined based on fluctuations or shifts in weight on either side or quadrant of the vehicle. For example, if occupants exit the vehicle at different points in time, the variation in weight distribution at each side or quadrant of the vehicle as occupants exit the vehicle can be used to estimate the number of occupants of the vehicle. Assuming that the occupants exit the vehicle at the same time, the fluctuation in the overall weight would be the same as compared to time. By monitoring the difference of weight fluctuation at each of the wheels of the vehicle, a determination can be made as to where the weight change is occurring. For example, as the driver exits the vehicle from the driver's seat, the weight can be distributed to a greater extent on the driver's front wheel. As a further example, if the driver exits the vehicle from the driver's seat and a passenger exits the passenger seat at the same time, the weight can be distributed to a great extent on both of the front wheels of the vehicle. It should be noted that the degree in weight fluctuation can be dependent on the suspension and chassis rigidity of the vehicle.

In an embodiment, an estimation engine executed on the processing device 118 can be implemented by the weight analysis subsystem 112 to receive as input the arrival vehicle weight and the unoccupied vehicle weight and outputs the estimated number of occupants of the vehicle. The estimated number of occupants can be electronically transmitted to and stored in an occupant database 126. The detected weight of the vehicle, the weight of the occupants and the number of occupants can be associated with the location of the weight sensor 102 and indicated in a location database 122.

The weight analysis subsystem 112 can be further configured to detect a re-entry of the occupant(s) into the vehicle and after purchases (or other object acquisitions) have been made at the location of interest based on an increase in the unoccupied vehicle weight to a loaded vehicle weight as detected by the weight sensor 102. In particular, the loaded vehicle weight can correspond to the unoccupied vehicle weight, the occupant weight, and the weight of products purchased at the location of interest and loaded into the vehicle for transport. The loaded vehicle weight can be electronically transmitted to and stored in the vehicle weight database 106.

The purchase weight corresponding to the weight of products purchased at the location of interest can be determined by the weight analysis subsystem 112 as the difference between the arrival vehicle weight and the loaded vehicle weight. For example, if the arrival vehicle weight is measured as approximately 3800 lbs and the loaded vehicle weight is measured as approximately 3900 lbs, the purchase weight can be estimated as approximately 100 lbs. The purchase weight can be electronically transmitted to and stored in a purchase database 130. The weight analysis subsystem 112 can detect a departure time of the vehicle from the geographic location based on the absence or substantial reduction of the vehicle weight at the geographic location, and the departure time can be electronically transmitted to and stored in the time database 124 for the respective weight sensor 102. Based on the difference between the arrival time and departure time of the vehicle, the weight analysis subsystem 112 can estimate the total on-site time of the vehicle, and the total on-site time can be electronically transmitted to and stored in the time database 124.

In an embodiment, the system 100 can include a transaction database 132. The transaction database 132 can include information corresponding to transactions at one or more computational devices, such as a point-of-sale terminal including a cash drawer and transaction receipt roll at a retail establishment, including individual names, items purchased, time of purchase, or the like. In an embodiment, the weight analysis subsystem 112 can implement a correlation engine of the processing device 118 to retrieve transaction data from the transaction database 132. The transaction data retrieved can be associated with a purchase of products at the retail establishment having an aggregate product weight corresponding (or substantially corresponding) to the purchase weight estimated from the weight change detected by the weight sensor 102.

In one embodiment, the system 100 may retrieve enough information to definitively associate transaction data to a particular individual associated with the vehicle such as where only a single transaction occurs in a time period and the individual involved in the transaction is definitively identified in the transaction data. In another embodiment, where the individual's name is not available from the transaction data, the transaction data may be associated with the identified vehicle in the database as part of a broad category of vehicle (e.g. SUV making purchase of 300 pounds of products). In yet another embodiment, the system 100 can match the transaction data to a specific vehicle based on time. For example, the system 100 can detect the time at which the vehicle is loaded with purchased items based on weight fluctuations, and further detects the time of the transaction at the location of interest. Based on the known location of the vehicle relative to the location of interest and an estimated average walking speed of a customer, the system 100 can estimate the time period for walking from the location of interest to the vehicle after the transaction has occurred. Each type of association may provide information to the location of interest regarding its customer base.

The transaction data retrieved can be for a purchase completed subsequent to detection of the arrival of the vehicle (and prior to detection of the loaded vehicle weight) to ensure that the retrieved transaction data corresponds to the appropriate vehicle. Upon retrieval and selection of the appropriate transaction data, the transaction data can be associated with the data stored in the database 108. In an embodiment, the transaction data correlated with the number of vehicles in the geographic locations can be used to determine an average transaction size and establish traffic (volume of individuals) at the location of interest over time. In an embodiment, based on the arrival time of the vehicle and a time of completion of the purchase (e.g., determined from the transaction data) a total time spent by the individual in the location of interest may be estimated. The total time spent by the individual in the location of interest can be electronically transmitted to and stored in the time database 124.

In an embodiment, the system 100 can optionally include one or more audio detectors 136 disposed within the pre-defined geographic location. The location database 122 can include information corresponding to the physical location of each audio detector 136 relative to each pre-define geographic location associated with the location of interest, as well as the audio detector 136 specifications. Each audio detector 136 can be configured to capture sound associated with the vehicle within the respective pre-defined geographic location, such as the opening and closing of doors of the vehicle. The weight analysis subsystem 112 can be in electronic communication with each of the audio detectors 136, and can be configured to receive sound data from the audio detectors 136. The sound data can be electronically transmitted to and stored in a sound database 138 via the communication interface 110.

The weight analysis subsystem 112 can identify the sound of one or more closing doors on the vehicle based on the sound data from the audio detector 136 in the respective pre-defined geographic location. The weight analysis subsystem 112 can further estimate the number of closing doors based on the identified sounds of the one or more closing doors on the vehicle. Using the number of closing doors, the weight analysis subsystem 112 can estimate the number of occupants of the vehicle. In an embodiment, the estimated number of occupants determined from the sound data can be compared to the estimated number of occupants determined from the weight data to ensure that the correct number of occupants is captured by the system 100. In an embodiment, the estimated number of occupants determined from the sound data can be used to supplement the estimated number of occupants determined from the weight data.

In an embodiment, the estimated number of occupants determined from the sound data, the estimated number of occupants determined from the weight data, and the final estimated number of occupants can be electronically stored in the occupant database 126. In an embodiment, the system 100 can include a separate sound analysis subsystem for identifying and analyzing the sound data detected by the audio detectors 136. In an embodiment, the detected weight and/or audio (or the lack of detected weight changes and/or audio over time) can be used as an indicator of a vehicle abandoned at the geographic location. In an embodiment, the detected weight data, detected audio data and/or determinations by the weight analysis subsystem 112 can be displayed to a user of the system 100 (e.g., a manager or associate of the location of interest) via a graphical user interface (GUI) 140 generated on a computing device.

Figure 2:
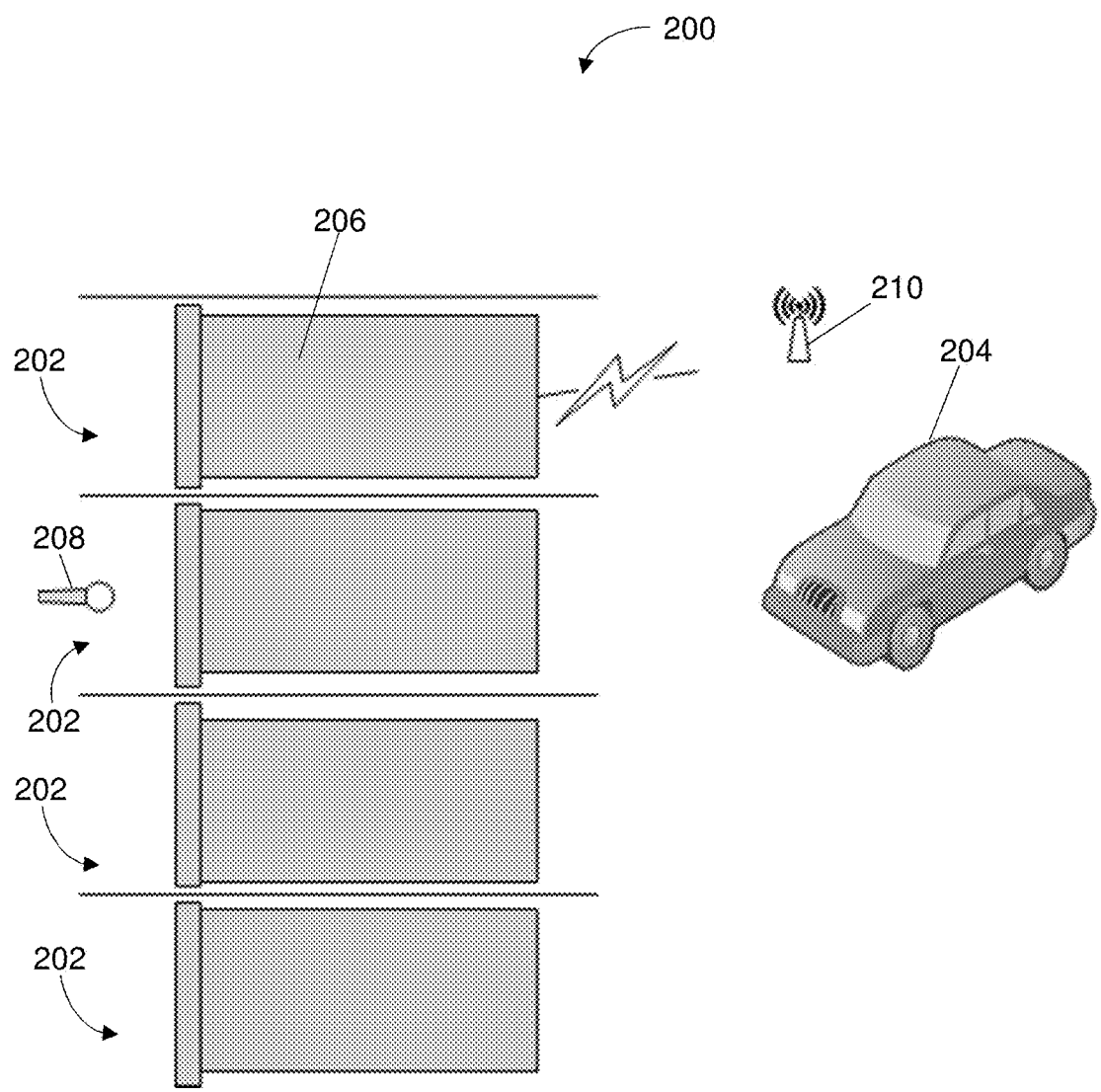
FIG. 2 is a block diagram of an exemplary sensor environment of a vehicle analysis system in an embodiment.

FIG. 2 is a block diagram of an exemplary sensor environment 200 of the system 100. The sensor environment 200 can include multiple pre-defined geographic locations 202. As a non-limiting example, the geographic locations 202 in FIG. 2 are illustrated as individual parking spaces for vehicles 204. Each geographic location 202 includes a weight sensor 206 disposed therein. As noted above, each weight sensor 206 is configured to measure or detect the weight of the vehicle 204 at different points in time between an arrival time and a departure time of the vehicle 204 from the geographic location 202.

In an embodiment, the sensor environment 200 can also include an audio detector 208 configured to detect sounds associated with the vehicle 204, such as the opening and closing of doors on the vehicle. Although illustrated as a single audio detector 208 for a group of pre-defined geographic locations 202, in an embodiment, each pre-defined geographic location 202 can include a separate audio detector 208. The sensor environment 200 may include one or more wireless access points 210 that act as communication interfaces for electronic transmittal of the detected weight and sound data, respectively, from the weight sensors 206 and the audio detectors 208 to one or more of the components of the system 100. Alternatively, in another embodiment, the sensor environment 200 may utilize a wired communication interface for transmittal of the detected weight and sound data.

Figure 3:
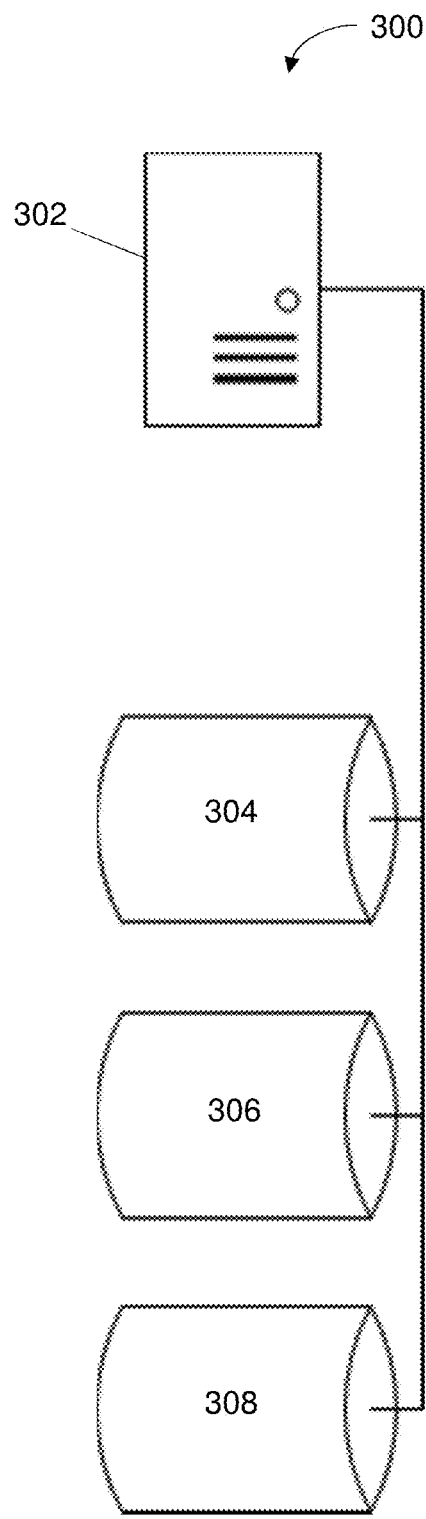
FIG. 3 is a block diagram of an exemplary database environment of a vehicle analysis system in an embodiment.

FIG. 3 is a block diagram of an exemplary database environment 300 of the system 100. The database environment 300 can include one or more servers 302 configured to receive detected weight and/or sound data, and store the weight and/or sound data in one or more databases. In an embodiment, the database environment 300 can include a vehicle weight database 304, an audio database 306, and a transaction data database 308. Thus, data from the weight sensors and/or the audio detectors can be stored in the database environment 300, and further electronically transmitted to one or more components of the system 100 for determination of vehicle identification and acquisition of data related thereto.

Figure 4:
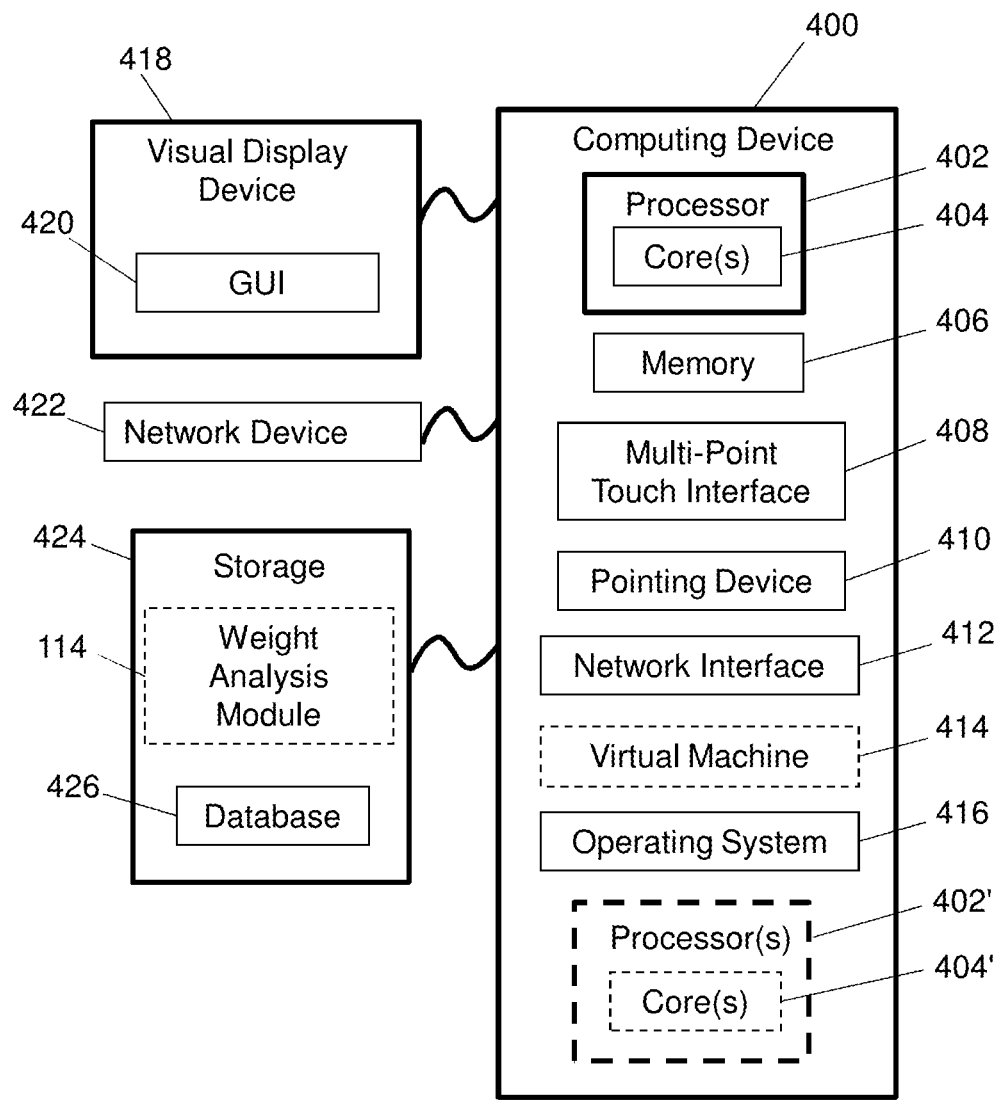
FIG. 4 is a block diagram of a computing device in accordance with exemplary embodiments.

FIG. 4 is a block diagram of a computing device 400 in accordance with exemplary embodiments of the present disclosure. The computing device 400 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 406 included in the computing device 400 may store computer-readable and computer-executable instructions or software for implementing exemplary embodiments (e.g., instructions for executing the weight analysis module 114, the estimation engine, the correlation engine, combinations thereof, or the like). The computing device 400 also includes configurable and/or programmable processor 402 and associated core 404, and optionally, one or more additional configurable and/or programmable processor(s) 402' and associated core(s) 404' (for example, in the case of computer systems having multiple processors/cores), for executing computer-readable and computer-executable instructions or software stored in the memory 406 and other programs for controlling system hardware. Processor 402 and processor(s) 402' may each be a single core processor or multiple core (404 and 404') processor.

Virtualization may be employed in the computing device 400 so that infrastructure and resources in the computing device 400 may be shared dynamically. A virtual machine 414 may be provided to handle a process running on multiple processors so that the process appears to be using only one computing resource rather than multiple computing resources. Multiple virtual machines may also be used with one processor.

Memory 406 may include a computer system memory or random access memory, such as DRAM, SRAM, EDO RAM, and the like. Memory 406 may include other types of memory as well, or combinations thereof.

A user may interact with the computing device 400 through a visual display device 418 (e.g., a personal computer, a mobile smart device, or the like), such as a computer monitor, which may display one or more user interfaces 420 (e.g., GUI 140) that may be provided in accordance with exemplary embodiments. The computing device 400 may include other I/O devices for receiving input from a user, for example, a keyboard or any suitable multi-point touch interface 408, a pointing device 410 (e.g., a mouse). The keyboard 408 and the pointing device 410 may be coupled to the visual display device 418. The computing device 400 may include other suitable conventional I/O peripherals.

The computing device 400 may also include one or more storage devices 424, such as a hard-drive, CD-ROM, or other computer readable media, for storing data and computer-readable instructions and/or software that implement exemplary embodiments of the weight analysis module 114, the estimation engine, the correlation engine, combinations thereof, or the like, described herein. Exemplary storage device 424 may also include one or more databases 426 for storing any suitable information required to implement exemplary embodiments. For example, exemplary storage device 424 can include one or more databases 426 for storing information, such as data relating to the location database 122, time database 124, vehicle weight database 106, occupant database 126, purchase database 130, transaction database 132, and/or sound database 138. The databases 426 may be updated by manually or automatically at any suitable time to add, delete, and/or update one or more items in the databases 426. It will be appreciated that all or some of the databases described herein may be combined into fewer or more databases and that databases holding other types of information as part of a vehicle analysis system, in addition to or in combination with the specific types of databases listed herein should also be considered to be within the scope of the present invention.

The computing device 400 can include a network interface 412 configured to interface via one or more network devices 422 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 412 may include a built-in network adapter, network interface card, PCMCIA network card, card bus network adapter, wireless network adapter, USB network adapter, modem or any other device suitable for interfacing the computing device 400 to any type of network capable of communication and performing the operations described herein. Moreover, the computing device 400 may be any computer system, such as a workstation, desktop computer, server, laptop, handheld computer, tablet computer (e.g., the iPad™ tablet computer), mobile computing or communication device (e.g., the iPhone™ communication device), or other form of computing or telecommunications device that is capable of communication and that has sufficient processor power and memory capacity to perform the operations described herein.

The computing device 400 may run an operating system 416, such as versions of the Microsoft® Windows® operating systems, different releases of the Unix and Linux operating systems, versions of the MacOS® for Macintosh computers, embedded operating systems, real-time operating systems, open source operating systems, proprietary operating systems, or other operating systems capable of running on the computing device and performing the operations described herein. In exemplary embodiments, the operating system 416 may be run in native mode or emulated mode. In an exemplary embodiment, the operating system 416 may be run on one or more cloud machine instances.

Figure 5:
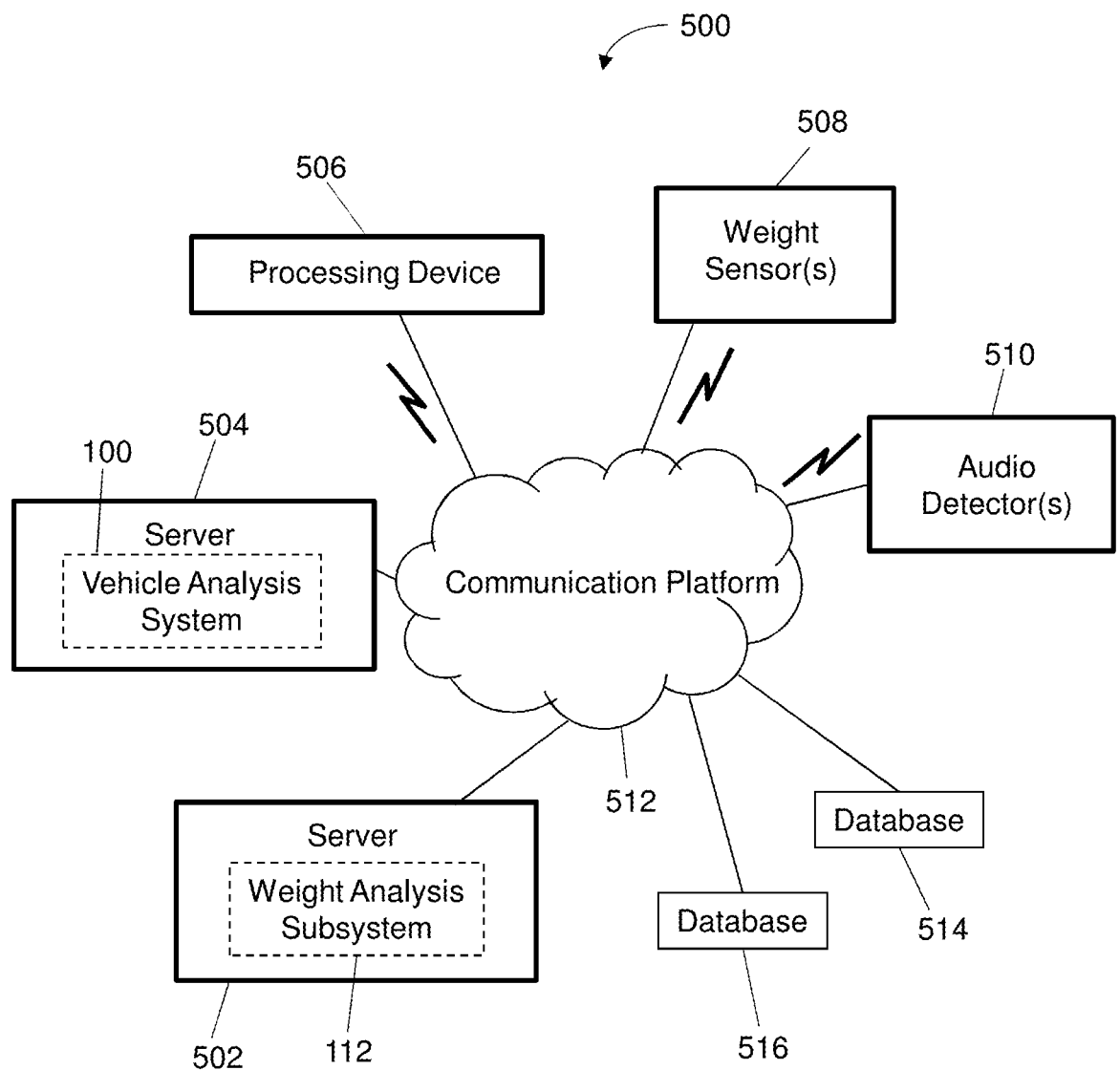
FIG. 5 is a block diagram of an exemplary vehicle analysis system environment in accordance with an embodiment.

FIG. 5 is a block diagram of an exemplary vehicle analysis system environment 500 in accordance with exemplary embodiments of the present disclosure. The environment 500 can include servers 502, 504 operatively coupled to a processing device 506, weight sensors 508, and audio detectors 510, via a communication platform 512, which can be any network over which information can be transmitted between devices communicatively coupled to the network. For example, the communication platform 512 can be the Internet, Intranet, virtual private network (VPN), wide area network (WAN), local area network (LAN), and the like. In an embodiment, the communication platform 512 can be part of a cloud environment.

The environment 500 can include repositories or databases 514, 516, which can be operatively coupled to the servers 502, 504, as well as to the processing device 506, the weight sensors 508, and the audio detectors 510, via the communications platform 512. In exemplary embodiments, the servers 502, 504, processing device 506, weight sensors 508, audio detectors 510, and databases 514, 516 can be implemented as computing devices (e.g., computing device 400). Those skilled in the art will recognize that the databases 514, 516 can be incorporated into one or more of the servers 502, 504 such that one or more of the servers 502, 504 can include databases 514, 516. In an embodiment, the location database 122, the time database 124, the vehicle weight database 106, the occupant database 126, the purchase database 130, the transaction database 132 and the sound database 138 can be stored on one or more of the databases 514, 516.

In an embodiment, embodiments of the servers 502, 504 can be configured to implement one or more portions of the system 100. For example, server 502 can be configured to implement one or more portions of the weight analysis subsystem 112, while server 504 can be configured to implement one or more portions of alternative components of the system 100.

Figure 6:
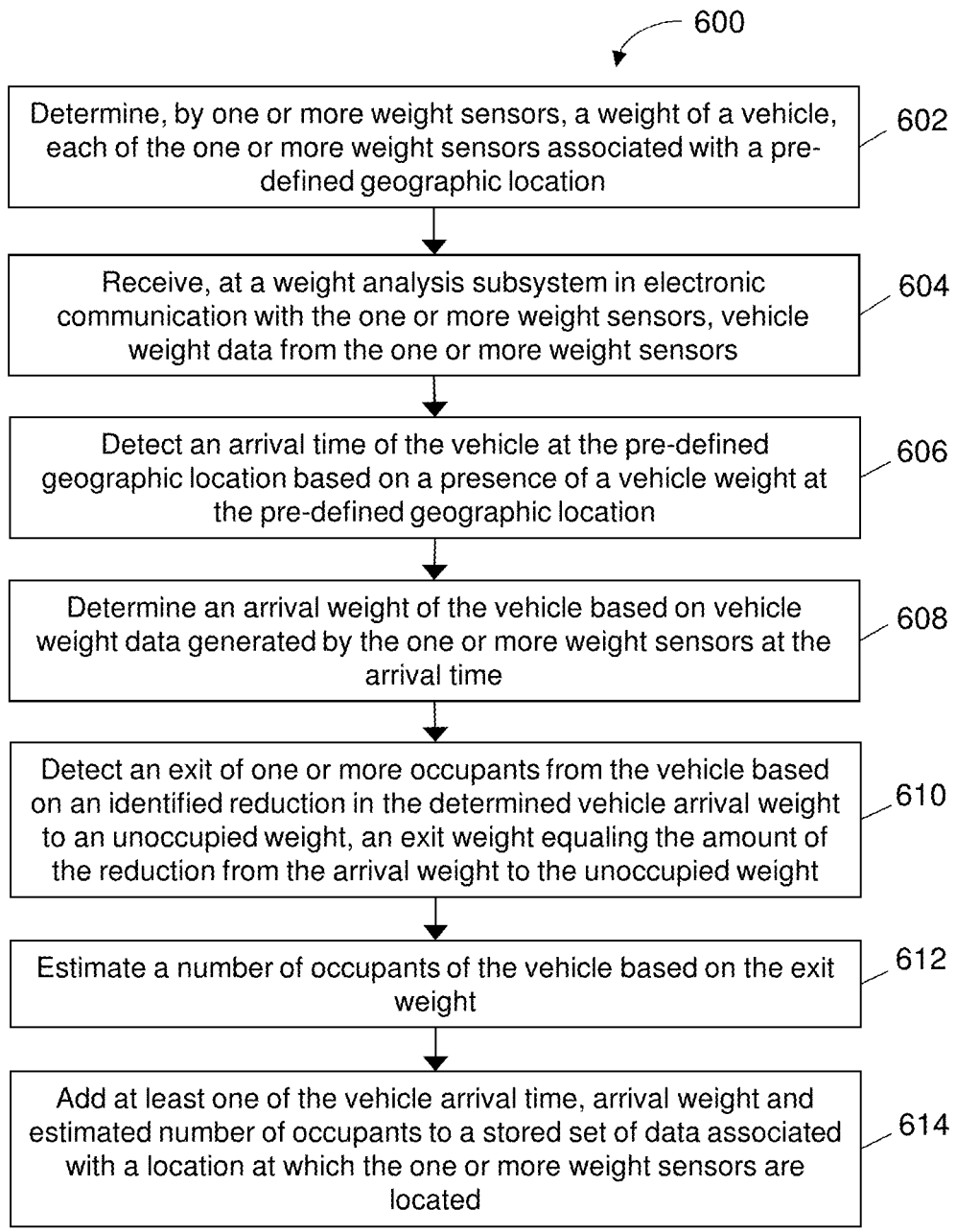
FIG. 6 is a flowchart illustrating an implementation of an exemplary vehicle analysis system in accordance with an embodiment.

FIG. 6 is a flowchart illustrating an exemplary process 600 as implemented by the vehicle analysis system 100 in an embodiment that includes sensors in the form of weight sensors. To begin, at step 602, the weight of the vehicle can be determined by one or more weight sensors, each of the one or more weight sensors being associated with the pre-defined geographic location. At step 604, the vehicle weight data can be received at the weight analysis subsystem from the one or more weight sensors. At step 606, an arrival time of the vehicle at the pre-defined geographic location can be detected based on a detection of a presence of the vehicle weight at the pre-defined geographic location. At step 608, an arrival weight of the vehicle can be determined based on the vehicle weight data generated by the one or more weight sensors at the arrival time.

At step 610, an exit of one or more occupants from the vehicle can be detected based on an identified reduction in the determine vehicle arrival weight to an unoccupied weight. An exit weight can equal the amount of the reduction from the arrival weight to the unoccupied weight. At step 612, a number of occupants of the vehicle can be estimated based on the exit weight. At step 614, the vehicle arrival time, arrival weight and/or estimated number of occupants can be added to a stored set of data associated with a location at which the one or more weight sensors are located.

Figure 7:
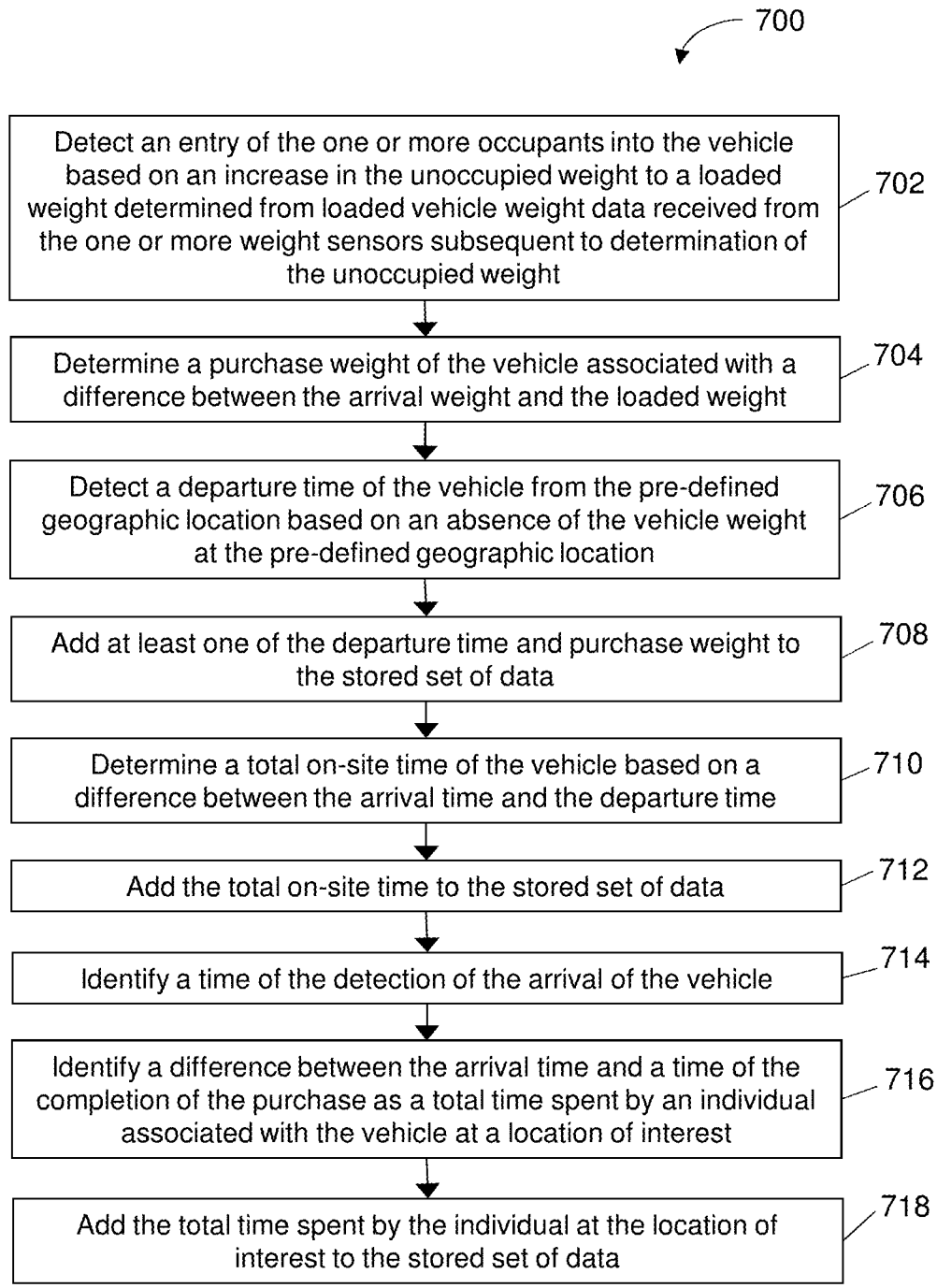
FIG. 7 is a flowchart illustrating an implementation of an exemplary vehicle analysis system in accordance with an embodiment.

FIG. 7 is a flowchart illustrating an exemplary process 700 as implemented by the vehicle analysis system 100 in an embodiment. To begin, at step 702, a re-entry of the one or more occupants into the vehicle can be detected based on an increase in the unoccupied weight to a loaded weight determined from loaded vehicle weight data received from the one or more weight sensors subsequent to determination of the unoccupied weight. At step 704, a purchase weight of the vehicle calculated as the difference between the arrival weight and the loaded weight can be determined. At step 706, a departure time of the vehicle can be detected from the pre-defined geographic location based on an absence of the vehicle weight at the pre-defined geographic location.

At step 708, the departure time and the purchase weight can be added to the stored set of data. At step 710, a total on-site time of the vehicle can be determined based on a difference between the arrival time and the departure time. At step 712, the total on-site time can be added to the stored set of data. At step 714, a time of detection of the arrival of the vehicle can be identified. At step 716, a difference between the arrival time and a time of the completion of the purchase can be identified as a total time spent by the individual associated with the vehicle in the location of interest. At step 718, the total time spent by the individual in the location of interest can be added to the stored set of data.

Figure 8:
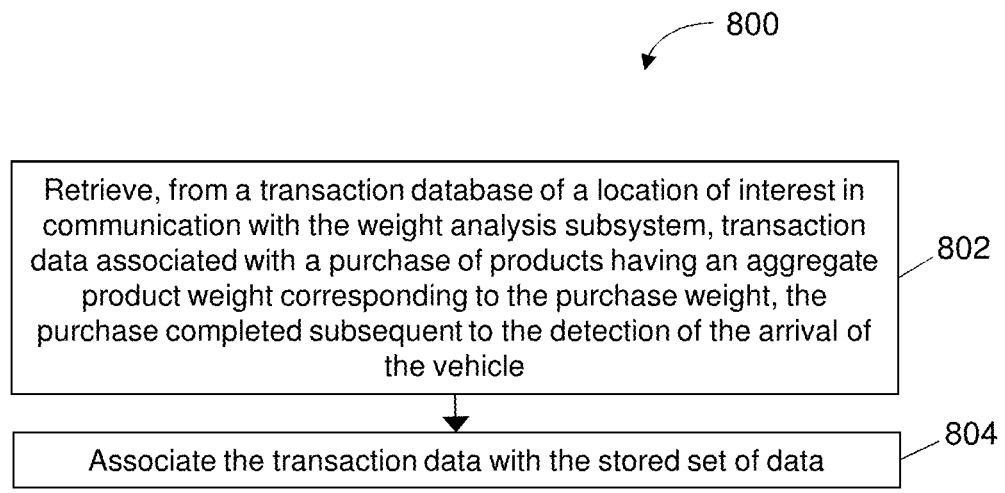
FIG. 8 is a flowchart illustrating an implementation of an exemplary vehicle analysis system in accordance with an embodiment.

FIG. 8 is a flowchart illustrating an exemplary process 800 as implemented by the vehicle analysis system 100 in an embodiment. To being, at step 802, transaction data associated with a purchase of products can be retrieved from a transaction database of a location of interest in communication with the weight analysis subsystem. The transaction data can include an aggregate product weight corresponding to the purchase weight. The purchase can be completed subsequent to the detection of the arrival of the vehicle. At step 804, the transaction data can be associated with the stored set of data for a specific vehicle.

Figure 9:
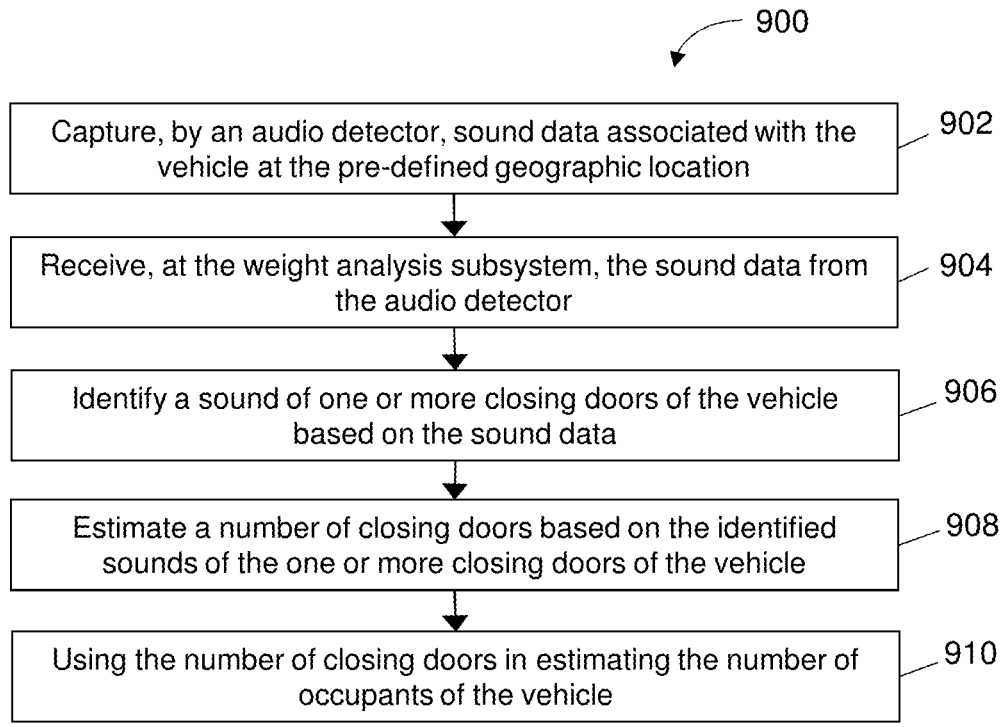
FIG. 9 is a flowchart illustrating an implementation of an exemplary vehicle analysis system in accordance with an embodiment.

FIG. 9 is a flowchart illustrating an exemplary process 900 as implemented by the vehicle analysis system 100 in an embodiment that includes sensors in the form of audio detectors. To being, at step 902, sound data associated with the vehicle at the pre-defined geographic location can be captured by one or more audio detectors. At step 904, the sound data from the audio detector can be received at the weight analysis subsystem (or alternatively a sound analysis subsystem). At step 906, a sound of one or more closing doors of the vehicle can be identified based on the sound data. At step 908, a number of closing doors can be estimated based on the identified sounds of the one or more closing doors of the vehicle. At step 910, the number of occupants of the vehicle can be estimated by using the number of closing doors.

Thus, the exemplary vehicle analysis system provides sensors for gathering data regarding individuals visiting a location of interest. In particular, the weight sensors are capable of determining the arrival and exit weight of the vehicle. Based on such detection a determination can be made regarding the number of occupants of the vehicle and the weight of the products purchased at the location of interest. Further, the audio detectors are capable of sensing the number of closing or opening doors of the vehicle. Based on such detection, a determination can be made regarding the number of occupants of the vehicle. Further still, correlation with transaction data supports the determinations made based on the detected weight, and improves the overall accuracy of the system.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A vehicle analysis system, comprising:
one or more weight sensors positioned to determine a weight of a vehicle, each of the one or more weight sensors associated with a pre-defined geographic location in the vicinity of a location of interest; and
a weight analysis subsystem in electronic communication with and configured to receive vehicle weight data from the one or more weight sensors, the weight analysis subsystem including:
 a location database storing the pre-defined geographic location of each of the one or more weight sensors;
 a processor;
 an audio detector disposed at one or more of the pre-defined geographic locations and configured to capture sound associated with the vehicle; and
 a memory, the memory including instructions for a weight analysis module that, when executed by the processor, cause the weight analysis subsystem to:
  detect an arrival time of the vehicle at the pre-defined geographic location based on a detectable vehicle weight occurring at the pre-defined geographic location;
  determine an arrival weight of the vehicle based on vehicle weight data generated by the one or more weight sensors at the arrival time;
  detect an exit of one or more occupants from the vehicle based on an identified reduction in the determined vehicle arrival weight to an unoccupied weight, an exit weight equaling the amount of the reduction from the arrival weight to the unoccupied weight;
  communicate with the audio detector to retrieve captured sound identifying sound of one or more closing doors on the vehicle;
  estimate a number of closing doors based on the identified sounds of the one or more closing doors on the vehicle;
  estimate a number of occupants of the vehicle based on the exit weight and the estimated number of closing doors; and
  add at least one of the vehicle arrival time, arrival weight and estimated number of occupants to a stored set of data associated with a location at which the one or more weight sensors are located.

2. The vehicle analysis system of claim 1, wherein the pre-defined geographic location is an individual parking lot space.

3. The vehicle analysis system of claim 1, wherein the weight analysis module further includes instructions that, when executed by the processor, cause the weight analysis subsystem to:
detect an entry of the one or more occupants into the vehicle based on an increase in the unoccupied weight to a loaded weight determined from loaded vehicle weight data received from the one or more weight sensors subsequent to determination of the unoccupied weight;
determine a purchase weight of the vehicle representing a difference between the arrival weight and the loaded weight, the purchase weight indicative of a weight of products purchased by the one or more occupants;
detect a departure time of the vehicle from the pre-defined geographic location based on an absence of the vehicle weight at the pre-defined geographic location; and
add at least one of the departure time and purchase weight to the stored set of data.

4. The vehicle analysis system of claim 3, wherein the weight analysis module further includes instructions that, when executed by the processor, cause the weight analysis subsystem to:
retrieve, from a transaction database of a location in communication with the weight analysis subsystem, transaction data associated with a purchase of products having an aggregate product weight corresponding to the purchase weight, the purchase completed subsequent to the detection of the arrival of the vehicle; and
associate the transaction data with the vehicle associated with the purchase weight.

5. The vehicle analysis system of claim 3, wherein the weight analysis module further includes instructions that, when executed by the processor, cause the weight analysis subsystem to:
determine a total on-site time of the vehicle based on a difference between the arrival time and the departure time; and
add the total on-site time to the stored set of data.

6. The vehicle analysis system of claim 3, wherein the weight analysis module further includes instructions that, when executed by the processor, cause the weight analysis subsystem to:
identify a time of the detection of the arrival of the vehicle;
identify a difference between the arrival time and a time of the completion of the purchase as a total time spent by an individual associated with the vehicle in the location of interest; and
add the total time spent by the individual associated with the vehicle in the location of interest to the stored set of data.

7. The vehicle analysis system of claim 1, wherein the number of occupants of the vehicle is estimated by dividing the exit weight by an expected occupant weight and the estimated number of closing doors.

8. The vehicle analysis system of claim 7, wherein the weight analysis module further includes instructions that, when executed by the processor, cause the weight analysis subsystem to:
determine the expected occupant weight based at least in part on the pre-defined geographic location or a time of day of the detection of the arrival of the vehicle.

9. A method of vehicle analysis, comprising:
determining, by one or more weight sensors, a weight of a vehicle, each of the one or more weight sensors associated with a pre-defined geographic location in the vicinity of a location of interest;
receiving, at a weight analysis subsystem in electronic communication with the one or more weight sensors, vehicle weight data from the one or more weight sensors;
detecting an arrival time of the vehicle at the pre-defined geographic location based on a presence of a vehicle weight at the pre-defined geographic location;
determining an arrival weight of the vehicle based on vehicle weight data generated by the one or more weight sensors at the arrival time;
detecting an exit of one or more occupants from the vehicle based on an identified reduction in the determined vehicle arrival weight to an unoccupied weight, an exit weight equaling the amount of the reduction from the arrival weight to the unoccupied weight;

communicating with an audio detector disposed at one or more of the pre-defined geographic locations and configured to capture sound associated with the vehicle to retrieve captured sound identifying sound of one or more closing doors on the vehicle;

estimating a number of closing doors based on the identified sounds of the one or more closing doors on the vehicle;

estimating a number of occupants of the vehicle based on the exit weight and the estimated number of closing doors; and adding at least one of the vehicle arrival time, arrival weight and estimated number of occupants to a stored set of data associated with a location at which the one or more weight sensors are located.

10. The method of claim 9, further comprising:

detecting an entry of the one or more occupants into the vehicle based on an increase in the unoccupied weight to a loaded weight determined from loaded vehicle weight data received from the one or more weight sensors subsequent to determination of the unoccupied weight;

determining a purchase weight of the vehicle associated with a difference between the arrival weight and the loaded weight, the purchase weight indicative of a weight of products purchased by the one or more occupants;

detecting a departure time of the vehicle from the pre-defined geographic location based on an absence of the vehicle weight at the pre-defined geographic location; and adding at least one of the departure time and purchase weight to the stored set of data.

11. The method of claim 10, further comprising:

retrieving, from a transaction database of a location in communication with the weight analysis subsystem, transaction data associated with a purchase of products having an aggregate product weight corresponding to the purchase weight, the purchase completed subsequent to the detection of the arrival of the vehicle; and associating the transaction data with the vehicle associated with the purchase weight.

12. The method of claim 11, further comprising:

determining a total on-site time of the vehicle based on a difference between the arrival time and the departure time; and adding the total on-site time to the stored set of data.

13. The method of claim 11, further comprising:

identifying a time of the detection of the arrival of the vehicle;

identifying a difference between the arrival time and a time of the completion of the purchase as a total time spent by an individual associated with the vehicle in the location of interest; and adding the total time spent by the individual associated with the vehicle in the location of interest to the stored set of data.

14. A non-transitory medium holding computer-executable instructions for vehicle analysis, the instructions when executed causing at least one processing device to:

determine, by one or more weight sensors, a weight of a vehicle, each of the one or more weight sensors associated with a pre-defined geographic location in the vicinity of a location of interest;

receive, at a weight analysis subsystem in electronic communication with the one or more weight sensors, vehicle weight data from the one or more weight sensors;

detect an arrival time of the vehicle at the pre-defined geographic location based on a presence of a vehicle weight at the pre-defined geographic location;

determine an arrival weight of the vehicle based on vehicle weight data generated by the one or more weight sensors at the arrival time;

detect an exit of one or more occupants from the vehicle based on an identified reduction in the determined vehicle arrival weight to an unoccupied weight, an exit weight equaling the amount of the reduction from the arrival weight to the unoccupied weight;

communicate with an audio detector disposed at one or more of the pre-defined geographic locations and configured to capture sound associated with the vehicle to retrieve captured sound identifying sound of one or more closing doors on the vehicle;

estimate a number of closing doors based on the identified sounds of the one or more closing doors on the vehicle;

estimate a number of occupants of the vehicle based on the exit weight and the estimated number of closing doors; and add at least one of the vehicle arrival time, arrival weight and estimated number of occupants to a stored set of data associated with a location at which the one or more weight sensors are located.

15. The method of claim 14, wherein the instructions when executed further cause the at least one processing device to:

detect an entry of the one or more occupants into the vehicle based on an increase in the unoccupied weight to a loaded weight determined from loaded vehicle weight data received from the one or more weight sensors subsequent to determination of the unoccupied weight;

determine a purchase weight of the vehicle associated with a difference between the arrival weight and the loaded weight, the purchase weight indicative of a weight of products purchased by the one or more occupants;

detect a departure time of the vehicle from the pre-defined geographic location based on an absence of the vehicle weight at the pre-defined geographic location; and add at least one of the departure time and purchase weight to the stored set of data.

16. The method of claim 15, wherein the instructions when executed further cause the at least one processing device to:

retrieve, from a transaction database of a location in communication with the weight analysis subsystem, transaction data associated with a purchase of products having an aggregate product weight corresponding to the purchase weight, the purchase completed subsequent to the detection of the arrival of the vehicle; and associate the transaction data with the vehicle associated with the purchase weight.

17. The medium of claim 16, wherein the instructions when executed further cause the at least one processing device to:

determine a total on-site time of the vehicle based on a difference between the arrival time and the departure time; and add the total on-site time to the stored set of data.

* * * * *